United States Patent
Gooding et al.

[15] 3,674,934
[45] July 4, 1972

[54] MINIMUM SHIFT KEYED (MSK) PHASE MEASUREMENT DEVICE

[72] Inventors: Otis E. Gooding, Laurel; Alton E. Dixon, Townson, both of Md.

[73] Assignee: The United States of America as represented by the Secretary of the Navy

[22] Filed: Feb. 24, 1970

[21] Appl. No.: 13,397

[52] U.S. Cl. ............................................. 178/88, 325/320
[51] Int. Cl. ................................................. H04b 1/26
[58] Field of Search ............ 178/66, 67, 88, 695; 325/30, 325/320, 363, 58, 67, 419; 343/119; 324/181, 83

[56] References Cited

UNITED STATES PATENTS

| 3,447,085 | 5/1969 | Haas | 325/320 |
|---|---|---|---|
| 3,472,960 | 10/1969 | Gutleber | 325/320 X |
| 3,509,471 | 4/1970 | Puente | 178/69.5 X |
| 3,154,741 | 10/1964 | Attwood | 325/363 |

*Primary Examiner*—Robert L. Griffin
*Assistant Examiner*—Kenneth W. Weinstein
*Attorney*—Richard S. Sciascia, J. A. Cooke and R. J. Erickson

[57] ABSTRACT

Apparatus for measuring the phase of an unsynchronized but phase continuous and stabilized Minimum Shift Keyed (MSK) signal by monitoring the data channels of an MDK data communication system. This is accomplished by a phase synchronization and measurement technique that compensates for the phase shifts introduced from the MSK modulation scheme. Thus, time-varying phase changes caused by propagation effects are determinable.

5 Claims, 6 Drawing Figures

INVENTORS
OTIS E. GOODING
ALTON E. DIXON
BY
ATTORNEY

INVENTORS
OTIS E. GOODING
ALTON E. DIXON

MINIMUM SHIFT KEYED (MSK) PHASE MEASUREMENT DEVICE

BACKGROUND OF THE INVENTION

This invention generally relates to means for measuring the phase variations of a signal in the very low frequency (VLF) range. More specifically, this invention provides apparatus for determining the phase variations and perturbations caused by propagation effects of a Minimum Shift Keyed signal, hereinafter referred to as an MSK signal. The primary problem associated with MSK transmission is that in the generation of information, 180° phase ambiguities are produced. The difficulties associated with these phase ambiguities become apparent when switching from an upper sideband to a lower sideband or vice versa and then back to the original sideband. Due to the loss of synchronization there can be a net shift of one-half cycle during the switching process. Thus, any synchronization or lock-on to an information interval will be quite difficult. Also, any phase measurements taken to determine any propagational effects will reflect erroneous intelligence. Thus, in the design of any MSK phase measurement device a system for the synchronization of the information rates must be utilized.

It is an object of this invention to provide an MSK phase measurement device that will provide synchronization of the information rates.

It is another object of this invention to provide an MSK phase measurement device that will consistently determine the phase changes in the incoming VLF signal.

It is another object of this invention to provide an MSK phase measurement device having an output which accurately and consistently reflects the phase of the incoming MSK signal.

It is another object of this invention to eliminate 180° phase ambiguities associated with MSK signals.

It is another object of this invention to provide a phase monitoring technique that realizes maximum sensitivity.

It is another object of this invention to provide for an MSK phase measurement device that will accurately determine the beginning of an information interval.

These and other objects of the instant invention and the invention itself will become more easily understood when reference is made to the detailed description and also to the accompanying drawings in which.

DETAILED DESCRIPTION OF THE INVENTION

Figure 1:
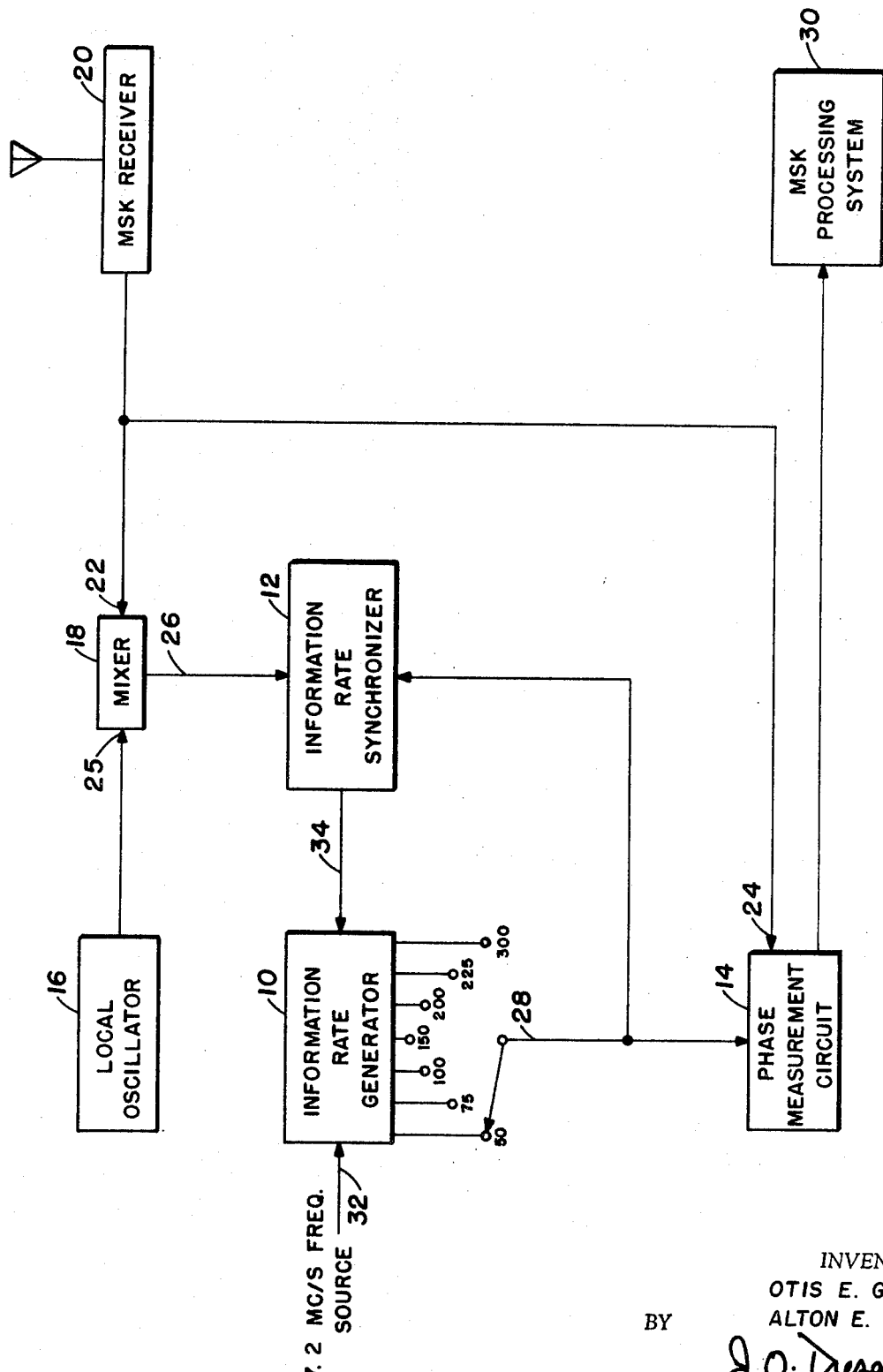
FIG. 1 is a block diagram of the over-all MSK phase measurement device proposed in accordance with the present invention.

Before any detailed discussion concerning the operation of the subject MSK phase measurement circuit can be effectively had, it would be appropriate to discuss the characteristics of the MSK signal. Basically, the MSK signal is a binary, frequency shifted, RF communication signal having output information intervals that are equivalent to the intervals formed in frequency shift keyed (FSK) modulation techniques. However, the MSK signal output offset frequency is directly related to the output information rate unlike the FSK signal. The MSK frequency modulation technique results in a frequency shift that minimizes the bandwidth in a given information rate. The MSK signal is a phase continuous, frequency discontinuous sinusoidal wave of constant amplitude. One of two sideband frequencies is generated for the d duration of an information interval. For an example of a minimum-shift communication system, see U.S. Pat. No. 2,977,417 issued on Mar. 28, 1961 to M. L. Doelz et al. The MSK signal at the transmitter can be expressed as:

a) for the upper sideband frequency, $V_t = V_{max} \sin 2\pi t (f_c + \Delta f) + K\pi$ or b) for the lower sideband frequency, $V_t = V_{max} \sin 2\pi t (f_c - \Delta f) + K\pi$ where $V_t$ = transmitter frequency $f_c$ = carrier frequency $\Delta f$ = information rate/4 and $K = 0$ or $1$

The term $(f_c + \Delta f)$ is the expression for the upper sideband frequency and $(f_c - \Delta f)$ is the expression for the lower sideband frequency. The term, $K$ indicates that the sidebands are generated with 180° phase ambiguities. The expression for the MSK signal at a receiver $(V_r)$ is similar to that at the transmitter. The only difference between the two expressions is an additional term $\theta(t)$ that represents the time varying phase angle caused by propagation effects.

The instant invention is capable of but not limited to the following information rates and frequency shifts (it should be noted that the terms information rate, and baud will hereinafter be used interchangeably since they are synonymous):

| Baud | ± Δf (Hertz) |
|------|-------------|
| 50   | 12.5        |
| 75   | 18.75       |
| 100  | 25.0        |
| 150  | 37.5        |
| 200  | 50.0        |
| 225  | 56.25       |
| 300  | 75.0        |

The above frequencies, $\Delta f$, are related to the information rate by the expression:

$$\pm \Delta f = (\text{information rate}/4)$$

The primary characteristics of the MSK signal that affect phase monitoring or phase tracking equipment are constant phase changes and random generation of 180° phase ambiguities. Phase changes are obtained by shifting the carrier frequency $\pm \Delta f$. Thus, the transmitted frequencies $(f_c + \Delta f)$ and $f_c - \Delta f)$ have a phase change of 90° per information interval with respect to the carrier source frequency, $f_c$. For example, with a carrier frequency of twenty kilohertz (20 KHZ) and an information interval of 10 milliseconds, a carrier signal will traverse 200 cycles and a transmitted upper and lower frequency signal will traverse through 200.25 cycles and 199.75 cycles respectively, during the information interval. Random generation of 180° ambiguities occur in both upper and lower sideband frequencies. Ambiguity in a sideband frequency depends upon the odd or even number of information intervals for which the other sideband frequency is transmitted.

Figure 2:
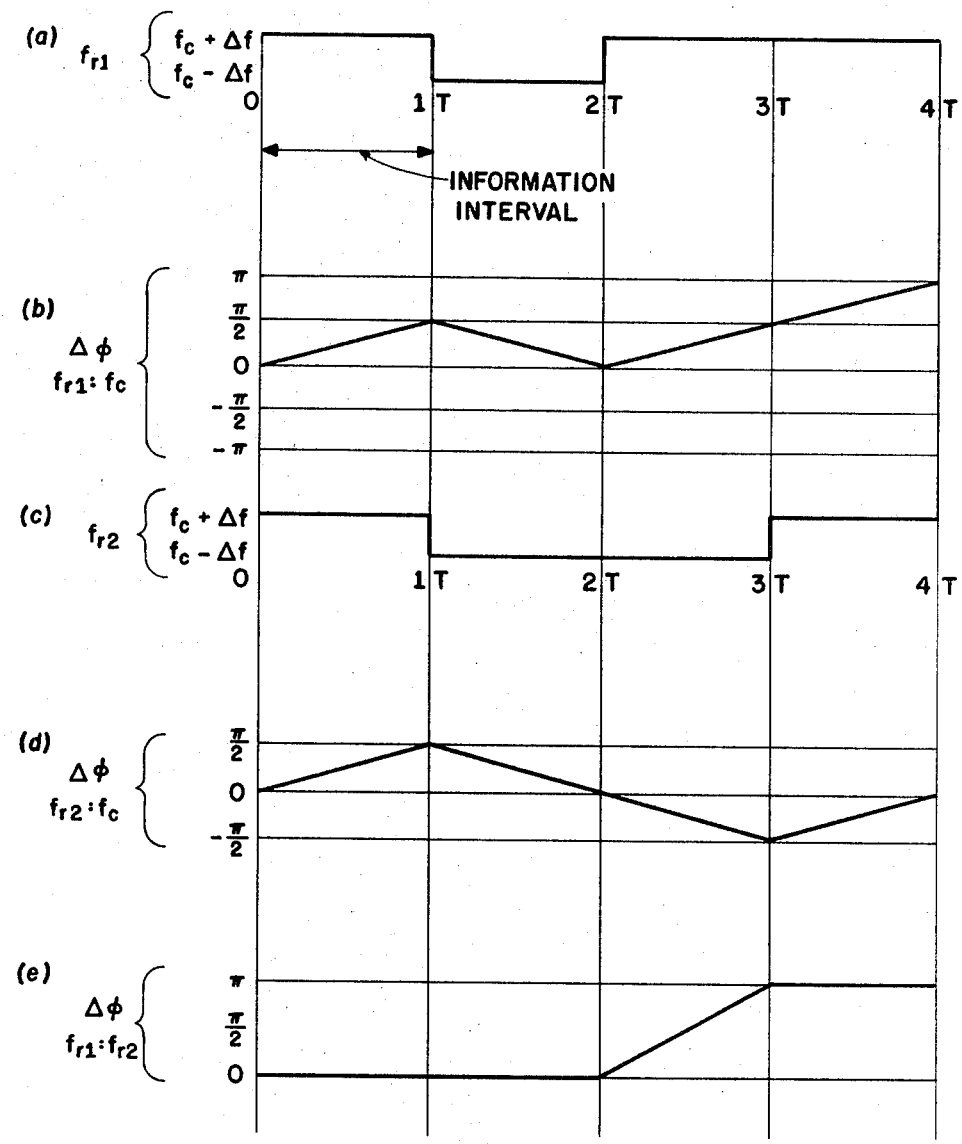
FIG. 2 is a waveform diagram illustrating how 180° phase ambiguities are generated in a typical MSK communication system.

FIG. 2 shows an example of how an ambiguity occurs. Two samples of an MSK signal are shown in lines (a) and (c) of FIG. 2. The only difference between the two signals is the polarity of the offset frequency, $\Delta f$, in information interval 2T through 3T. Line (b) shows the phase relationship between the MSK signal of line (a) and a carrier frequency, $f_c$. Line (d) shows the phase relationship $\Delta\phi$ between the MSK signal of line (c) and a carrier frequency, $f_c$. During information interval O through 1T and interval 3T through 4T, both samples of the MSK signal are at the upper sideband frequency $(f_c + \Delta f)$. As indicated by line (e), both MSK signals are in phase during the interval O through 1T, but are 180° out of phase during interval 3T through 4T. Therefore, it can be seen that the MSK modulation technique causes 180° phase ambiguities in the transmitted sideband frequencies.

Referring now to FIG. 1 there is shown a block diagram for the Minimum Shift Keyed phase measurement device of the present invention. The principal elements of the proposed measurement device are an information rate generator 10, formation rate synchronizer 12, phase measurement circuit 14, local oscillator 16 (operating, for example, at 22 KHZ) and mixer 18.

The incoming RF signals, which are usually in the VLF range, are received by MSK Receiver 20. These incoming RF signals are applied to the mixer 18 at input 22 and to phase measurement circuit 14 at input 24. The mixer 18 also receives a 22-KHZ signal at input 25 from oscillator 16. This 22-KHZ signal is combined with the incoming RF signal to produce an IF signal at 26.

The information rate generator 10 provides precise frequency reference signals for the phase measurement circuit 14 and for the information rate synchronizer 12. The information rate synchronizer 12 corrects the phase variation between the locally generated information rate signal shown at 28 and the beginning of the received transmission interval shown at output 26 of mixer 18. A phase measurement is taken at the beginning of the MSK information interval by the phase measurement circuit 14 and transferred to an MSK processing system 30 at the beginning of said processing system's processing interval.

The information rate generator 10 uses a 7.2-MHZ-reference frequency shown at 32 that is divisible by the above-listed information rates. One embodiment of the generator 10 that could produce these seven information rates would be a simple digital divider network. A sync correction signal shown at 34 is applied to the generator 10 to synchronize the phase of the information rate signal produced at 28 with the phase of the incoming MSK signal at 24.

The synchronization process of the information rate synchronizer 12 is accomplished by reconstructing the bit transitions of the received signal and correcting the phase of the locally generated information rate signal. A single sideband technique is used to establish the bit transitions. When the upper frequency is being received, the output signal at 34 of the information rate synchronizer 12 is a sinusoidal wave with its period equal to the information interval as is illustrated in FIG. 2. When the lower frequency is being received, the output signal at 34 of the information rate synchronizer 12 is a d.c. level. Furthermore, when the upper frequency is being received, the beginning of the generated sinusoidal wave corresponds to the beginning of an information interval.

The phase measurement circuit 14 samples the phase of the received RF signal at 24. At the beginning of an information interval, the phase difference between the received MSK signal at 24 and a locally generated reference signal at 28 is measured in microseconds. This is accomplished by counting 1 MHZ pulses that begins with the negative zero crossover of the received MSK signal and is terminated by a stop phase count signal.

Figure 3:
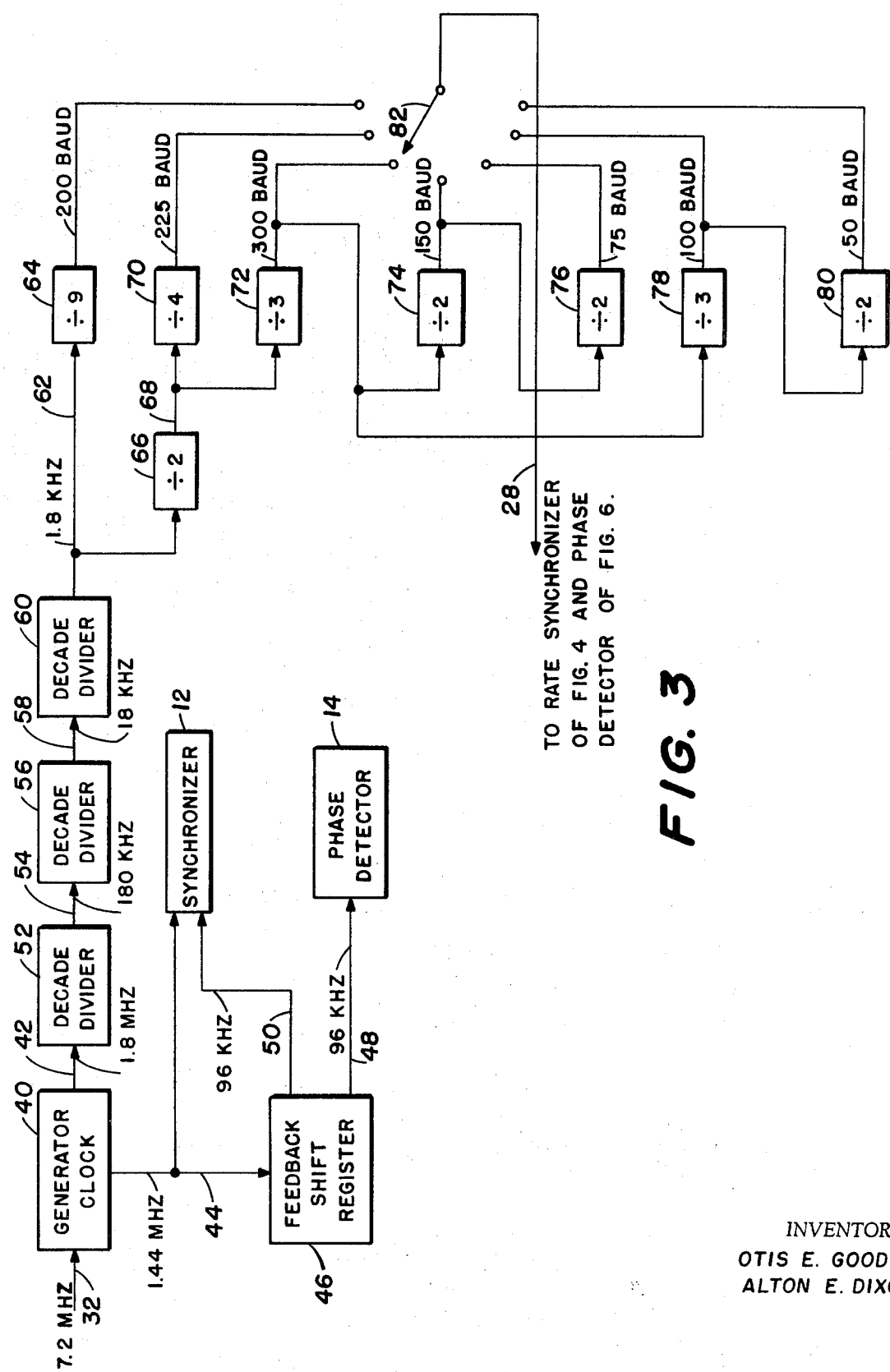
FIG. 3 is a block diagram illustrating the information rate generator employed in the measurement device of FIG. 1.

The purpose of the information rate generator, shown in detail in FIG. 3, is twofold: first, to provide a signal having a frequency of 4 times the carrier frequency for use in the synchronizer 12 and in the phase detector 14; and secondly, to provide the seven information rates:50, 75, 100, 150, 200, 225, and 300 bauds. More specifically, the input 7.2-MHZ signal, shown at 32 in FIG. 3 is separated by a generator clock 40 into two frequencies: a 1.8-MHZ signal shown at 42, and a 1.44-MHZ signal shown at 44. The 1.44-MHZ signal is fed to a feedback shift register 46. The binary digit pattern generated by the feedback shift register 46 is repeated every 15 counts of the inputs 1.44-MHZ clock signal. Upon reaching count fifteen, a frequency of 96 KHZ is detected and transmitted, via line 48, to the phase detector 14 and, via line 50, to the information rate synchronizer 12.

The 1.8-MHZ signal shown at 42 is applied to a first decade divider 52 which, like the succeeding decade dividers, is a feedback shift register of any well-known design wherein count ten represents 180 KHZ, as shown at 54, which is detected and applied to the next decade divider 56 which, in turn, produces an 18-KHZ signal shown at 58. The 18-KHZ signal is then applied to decade divider 60 to produce the desired 1.8-KHZ signal shown at 62.

The 1.8-KHZ signal is fed into a divide-by-9 circuit 64, to produce a baud or information rate of 200 bits/second. The 1.8 -KHZ signal is also fed into a divide-by-2 circuit 66, to produce a 900HZ signal at line 68. This 900 HZ signal is fed into a divide-by-4 circuit 70, therein producing an information rate of 225 bits/second, and also to a divide-by-3 circuit 72, therein producing a baud rate of 300 bits/second. The output of the divide-by-3 circuit 72 is fed to a divide-by-2 circuit 74, therein producing an information rate of 150 bits/second. The output of the divide-by-2 circuit 74 is fed into a second divide-by-2 circuit 76, therein producing an information rate of 75 bits/second. The output of the divide-by-3 circuits 72 is also fed to another divide-by-3 network 78, therein producing an information rate of 100 bits/second. The output of the divide-by-3 circuit 78 is fed to a divide-by-2 circuit 80, therein producing an information rate of 50 bits/second. As shown in FIG. 3, these various information rate signals are available at the information rate selector switch 82 and are applied to the information rate synchronizer of FIG. 4 and the phase detector circuit of FIG. 6, for purposes to be discussed hereinafter.

Figure 4:
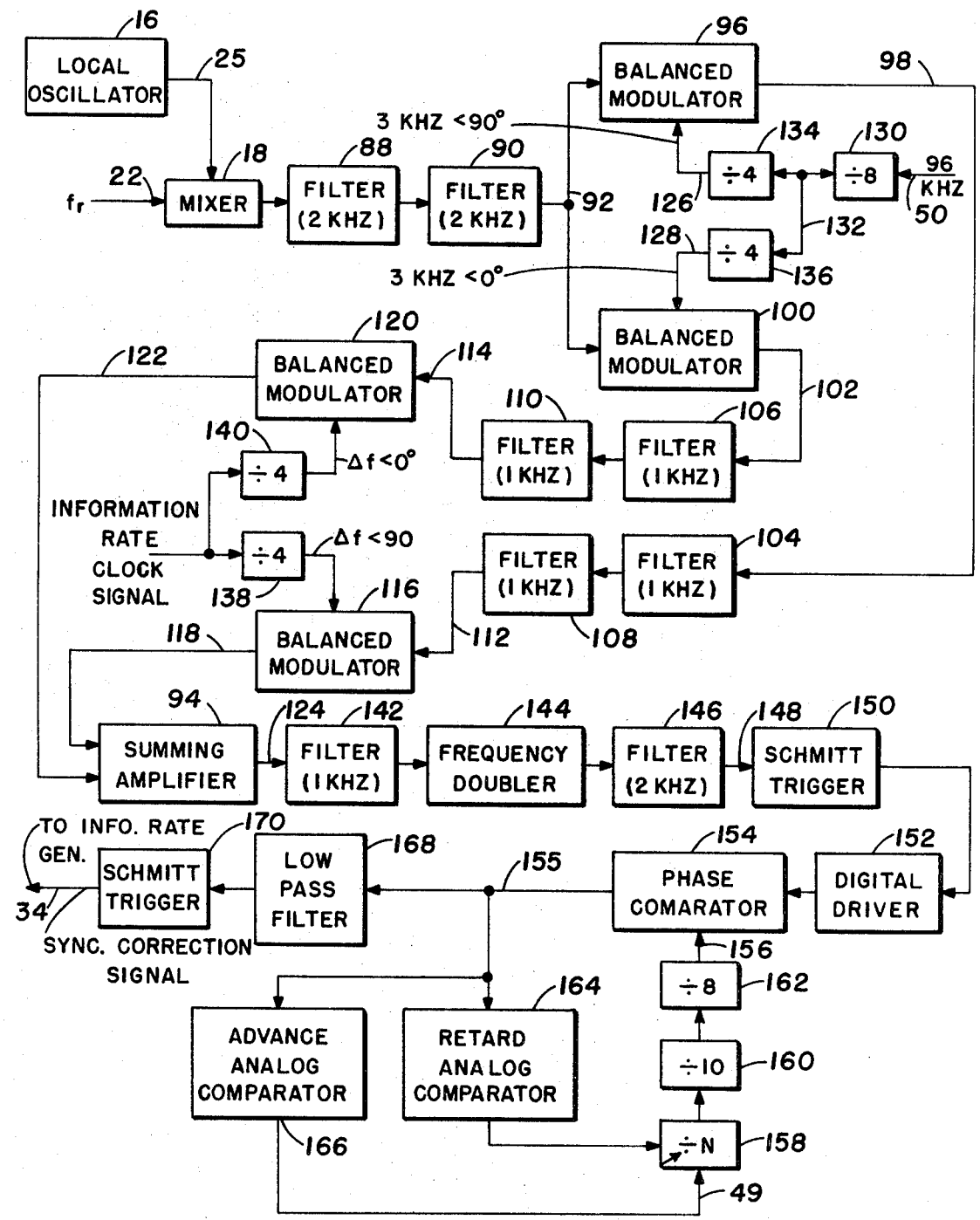
FIG. 4 is a block diagram illustrating the information rate synchronizer employed in the measurement device of FIG. 1.

Referring now to FIG. 4, there is shown the information rate synchronizer in conjunction with the local oscillator 16 and the mixer 18. The received MSK signal, $f_r$, shown at 22 and the locally generated oscillator signal shown at 25 are mixed by the mixer 18. The sum of the two input frequencies is rejected by filters 88 and 90 and the frequency of the difference signal appearing at 92, at the output of the filter 90, is (2 KHZ + $\Delta f$) or (2 KHZ − $\Delta f$) and is dependent upon which sideband is being received during a particular transmission interval. That is if the upper sideband ($f_c + \Delta f$) is being transmitted, the frequency of the output signal at 92 will be (2 KHZ + $\Delta f$) and if the lower sideband ($f_c - \Delta f$) is being transmitted, the frequency of the output signal at 92 will be (2 KHZ − $\Delta f$).

At this point, the signal equations will be used to explain the signal sideband technique used to generate the output signal of the summing amplifier 94. The designation for each equation is appropriately marked on FIG. 4.

For convenience, let the output signal ($e_1$) shown at 92 be expressed by the sinusoidal expression:

where $e_1 = K_n \cos(2\pi f_n t) f_n = (f - \text{IF} + \Delta f)$
or $f_n = (f - \text{IF} - \Delta f)$
where $f_c \pm \Delta f$ is the signal at 22, and IF is the signal at the output of mixer 18.

The output of the balanced modulator 96, on line 98, may be expressed as $e_{al}$ and is defined as:

$e_{al} = (e_1)(e_{ol})$, where $e_{ol} = 2\cos(2\pi f_o t)$
$e_{al} = K_n \cos[(2\pi f_n - 2\pi f_o)t] + K_n \cos[(2\pi f_n + 2\pi f_o)t]$ The output of the balanced modulator 100, on line 102, may be expressed as $e_{bl}$ and is defined as:

$e_{bl} = (e_l)(e_{o2})$, where $e_{o2}$ 32 $2\sin(2\pi f_o t)$
$e_{bl}$ 32 $K_n \sin[(2\pi f_n - 2\pi f_o)t] + K_n \sin[(2\pi f_n + 2\pi f_o)t]$ The signals $e_{al}$ and $e_{bl}$ are then passed through filters 104, 106, 108 and 110. The output of filter 108, on line 112 may be designated as $e_{a2}$ and is expressed as:

$$e_{a2} = K_n \cos[(2\pi f_n - 2\pi f_o)t]$$

The output of filter 110, shown at 114, may be designated as $e_{b2}$ and is expressed as:

$$e_{b2} = K_n \sin[(2\pi f_n - 2\pi f_o)t]$$

The expression for the output of modulator 116, shown at 118 and designated as $e_{a3}$, is:

$e_{a3} = (e_{a2})(e_{cl})$ where $e_{cl} = \cos(2\pi f_c t)$
$e_{a3} = (K_n/2)\cos[(2\pi f_c + 2\pi f_n - 2\pi f_o)t] + (K_n/2)\cos[(2\pi f_c - 2\pi f_n + 2\pi f_o)t]$ The expression for the output of modulator 120, shown at 122 and designated as $e_{b3}$, is:

$e_{b3} = (e_{b2})(e_{c2})$ where $e_{c2} = \sin(2\pi f_c t)$
$e_{b3} = (K_n/2)\cos[(2\pi f_c + 2\pi f_o)t] - (K_n/2)\cos[(2\pi f_c - 2\pi f_n + 2\pi f_o)t]$ The output of summing amplifier 94, which is shown at 124 and may be designated as $e_o$, is:

$$e_o = e_{a3} + e_{b3}$$

$$e_o = K_n \cos(2\pi f_c + 2\pi f_n - 2\pi f_o) t$$

Now considering the frequency ($f_{out}$) of the output signal $e_o$, shown at 124, there is obtained:

$$f_{out} = f_c + f_n - f_o$$

where $f_c = \Delta F$
and $f_o = 3$ KHZ

If the upper sideband is being received, there is obtained:
$f_{out} = \Delta f + (2 \text{ KHZ} + \Delta f) - 3 \text{ KHZ} = 1 \text{ KHZ} - 2\Delta f$
If the lower sideband is being received, there is obtained:
$f_{out} = \Delta f + (2 \text{ KHZ} - \Delta f) - 3 \text{ KHZ} = 1 \text{ KHZ}$
If the 180° out-of-phase signal, $e_1 = K_n \cos(2\pi f_n t + \pi)$, is being received, the output frequency is:
$f_{out} = 1 \text{ KHZ} - 2\Delta f + \pi$, for the upper sideband and $f_{out} = 1 \text{ KHZ} + \pi$, for the lower sideband.

The 96-KHZ signal shown at 50 in FIG. 4 is used to generate the 3-KHZ/90°-signal located at line 126 and designated as $e_{01}$, and also the 3-KHZ /0°-signal located at line 128 and designated as $e_{02}$. These signals $e_{01}$ and $e_{02}$ are injected into balanced modulators 96 and 100 respectively. More particularly, the 96-KHZ signal is fed into a divide-by-8 circuit 130 to provide a 12-KHZ signal, at 132, which is then fed into two divide-by-4 circuits 134 and 136, whose outputs are both at 3 KHZ but are 90° out of phase with each other, as noted above.

The information rate clock signal obtained from switch 82 of FIG. 3, as previously discussed, is used to generate the offset frequencies $\Delta f/90°$ and $\Delta f/0°$ signals which are injected into balanced modulators 116 and 120 respectively. As mentioned previously, the information rate clock signal is equal to 4 times the frequency shift $\Delta f$. Accordingly, the information rate clock signal is fed into two divide-by-4 circuits, 138 and 140, whose respective output frequencies are both $\Delta f$, but are 90° out of phase with each other.

Signal $e_o$ appearing on line 124 is filtered, by filter 142, and is then frequency doubled, in doubler 144, by a standard full-wave rectifier technique commonly employed in the art. Frequency doubling is required to compensate for the 180° phase ambiguities inherent in the received signal. The output of the frequency doubler 144 is filtered by filter 146. The frequency of the signal at 148 is 2 KHZ ± 4 $\Delta f$ or 2 KHZ depending upon whether the upper or lower sideband is utilized. The sinusoidal signal appearing at 148 is shaped into a square wave by Schmitt trigger 150 and applied to phase comparator 154 through the digital driver circuit 152. The other input to phase comparator 154, shown at 156, is a reference 2 kHZ signal which is obtained by feeding the 1.44-MHZ signal shown at 49 (from the generator-clock circuit 40 of FIG. 3) successively into a variable dividing circuit 158, divide-by-10 circuit 160, and divide-by-8 circuit 162. This 2-KHZ reference is advanced at 49 by advance analog comparator 166 or retarded at 47 by retard analog comparator 164 until the d.c. voltage level at the inputs of retard analog comparator 164 and advance analog comparator 166 is within ± millivolts of the signal at 155. When this condition exists, and there are information intervals where the upper sideband is being received, the outputs of low-pass filter 168 is a sinusoidal wave. The beginning of any cycle of this signal corresponds to the transition between two transmission intervals. Schmitt trigger 170 shapes the outputs of comparator 164 and 166 for use as a sync correction signal shown at 34, in FIGS. 1 and 4, for the information rate generator. Thus, the locally generated information rate signal is phase synchronized to the information rate of the received MSK signal.

Figure 5:
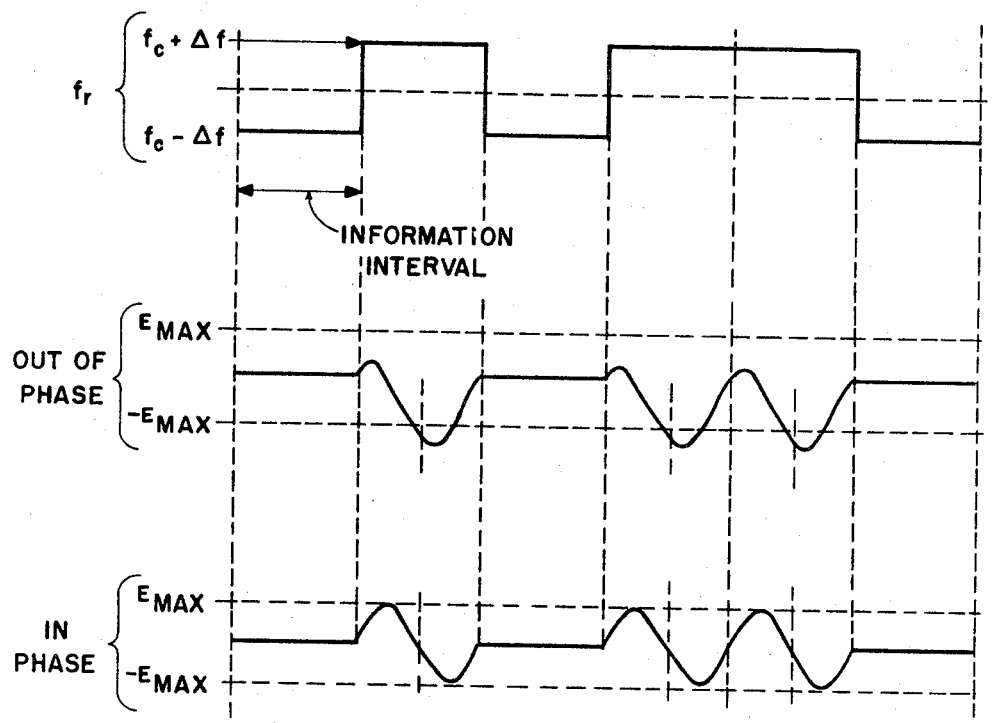
FIG. 5 is a graphical presentation illustrating the synchronous detection that occurs in the information rate synchronizer of FIG. 4.

The process of generating the sync correction signal as previously described is illustrated by the waveforms shown in FIG. 5. The first waveform, shown at the top of FIG. 5 is that signal which is applied to the phase comparator 154, of FIG. 4, from digital driver 152. As was described hereinabove, the phase comparator 154 converts this waveform into a sync correction signal as illustrated by the middle waveform of FIG. 5. However, the initial sync correction signal output of the phase comparator 154 is out of phase with the received signal shown at 22 in FIG. 4. Accordingly, the outputs of comparators 164 and 166 are fed into variable divider network 158 thereby correcting the phase error of the middle waveform of FIG. 5. After this phase correction has been accomplished, the output of phase comparator 154 is the bottom waveform of FIG. 5. It is this signal which is ultimately utilized as the sync correction signal shown at 34 in FIGS. 1 and 4.

Figure 6:
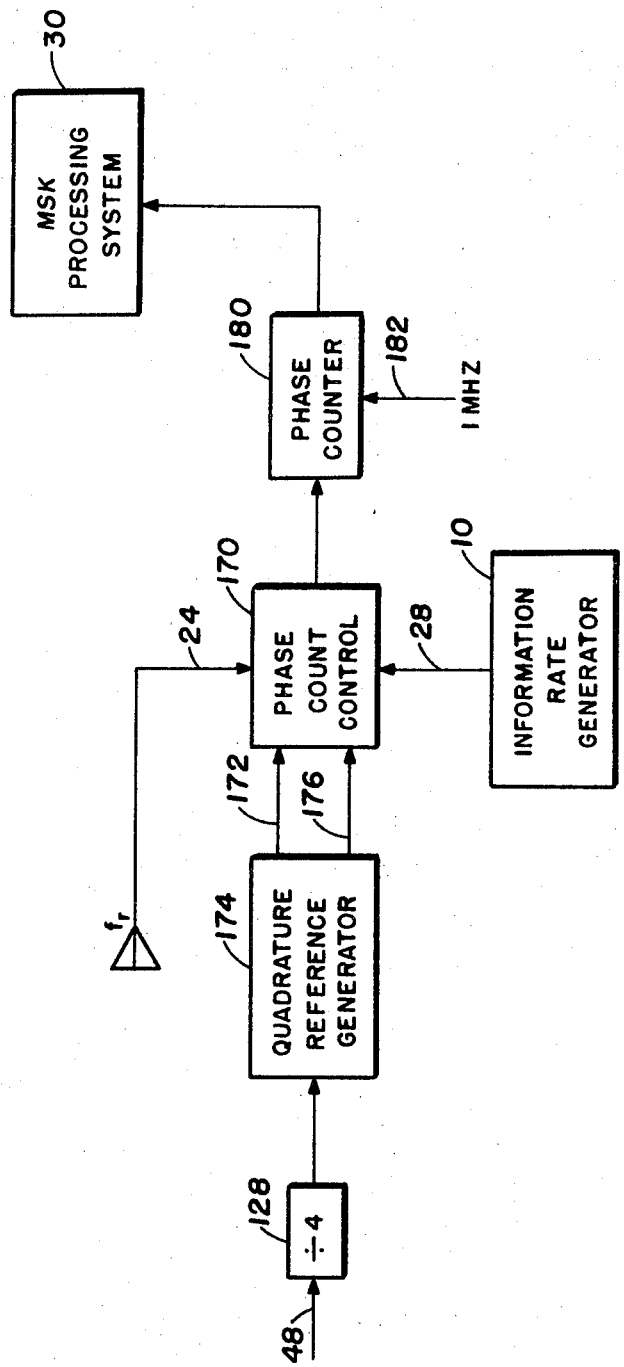
FIG. 6 is a block diagram illustrating the phase measurement circuit employed in the measurement device of FIG. 1.

There is shown in FIG. 6 the block diagram of the phase measurement circuit. A phase measurement begins on the first negative crossover of the received MSK signal shown at 24. However, this phase measurement can only occur after the beginning of an output information interval shown at 28 which is produced by information rate generator 10. The polarity of the crossover is referred to phase count control circuit 170.

The phase measurement is stopped by the stop phase count signal shown at 172 which is produced by the quadrature reference generator 174. The quadrature reference generator 174 also produces a signal to start the phase measurement. This signal, known as the start phase count, is shown at 176. The input frequency of the quadrature reference generator 174 is supplied, via line 48, by the information rate generator 10, through a divide-by-4 network 178. Since the input frequency 48 is 96 KHZ, the frequency supplied to the quadrature reference generator 174 by the divide-by-4 network 178 is 24 KHZ. Also fed into the phase count control circuit 170, is the information rate clock signal 28 as provided by the information rate generator 10. Therefore the number of phase measurements obtained during a one second interval is determined by the information rate. The phase measurement, which is in microseconds, is obtained by counting the number of 1 MHZ pulses that occur between the start and stop pulses. This measurement is physically taken in phase counter 180. The 1-MHZ-reference signal is shown at 182. The accuracy of the phase measurement therefore is ± 1 microsecond. The output of phase counter is fed into the MSK processing system 30, as previously described.

In summary therefore, there has been described a unique MSK converter that is capable of producing phase measurements at various information rates regardless of phase ambiguities in the input signal. This is principally accomplished by means of an information rate generator in conjunction with an information rate synchronizer thereby producing the desired synchronization between the incoming MSK signal and the generated information rate signal thereby allowing for the precise phase measurement at the beginning of the information rate interval.

What is claimed is:

1. A minimum shift keyed phase measurement device comprising:

a source of incoming, phase ambiguous minimum shift keyed signals, said signals having various information rates;

means for generating a specified and selectable information rate, said information rate generating means having an output of unsynchronized minimum shift keyed signals;

means for synchronizing, at the beginning of an information interval, the phase of one of said output signals of said information rate generating means with the phase of said incoming minimum shift keyed signal by producing a synchronous correction signal representative of the phase difference between said output of said information rate generating means and said incoming minimum shift keyed signals, said synchronizing means using this synchronous correction signal to adjust the output of said information rate generating means so as to be in phase synchronization with said incoming minimum shift keyed signal at the beginning of an information interval; and means for measuring the phase difference between said synchronized output of said information rate generating means and said incoming minimum shift keyed signal throughout the duration of said information interval, wherein said phase difference measurement means comprises:

means for determining the beginning of an information interval of said incoming minimum shift keyed signal and said generated information rate signal;

means for starting the phase measurement;

means for stopping the phase measurement; and means for generating a pulse train responsive to said start and stop phase count whereby the phase measurement is represented by the number of pulses accumulated after the beginning of an information interval and between said start phase count signal and said stop phase count signal.

2. The minimum shift keyed phase measurement device as claimed in claim 1 wherein said information rate generating means comprises:

a source of operating frequency, and a plurality of dividing means for reducing said operating frequency into a plurality of signals having predetermined information rates.

3. The minimum shift keyed phase measurement device as claimed in claim 2 wherein said dividing means comprises:

a plurality of cascaded decade dividers for reducing said operating frequency to a second and lesser frequency, and a plurality of digital dividing networks, said networks receiving said second frequency output of said cascaded decade dividers and converting said output into a plurality of information rate signals.

4. The minimum shift keyed phase measurement device as claimed in claim 3 wherein said responding means are analog comparators.

5. The minimum shift keyed phase measurement device as claimed in claim 4 wherein said means for generating said stop phase count signals is a quadrature reference generator.

* * * * *